United States Patent [19]

Dexter et al.

[11] 3,907,862
[45] Sept. 23, 1975

[54] HINDERED PHENOLIC CYANO COMPOUNDS

[75] Inventors: Martin Dexter, Briarcliff Manor; John D. Spivack, Spring Valley, both of N.Y.

[73] Assignee: Ciba-Geigy Corporation, Ardsley, N.Y.

[22] Filed: Nov. 6, 1972

[21] Appl. No.: 303,913

Related U.S. Application Data

[63] Continuation-in-part of Ser. No. 616,801, Feb. 17, 1967, Pat. No. 3,721,704.

[52] U.S. Cl. ............. 260/465 D; 252/403; 252/405; 260/45.85; 260/45.9 R; 260/45.9 NC; 260/465 F; 260/471 A; 260/559 R; 260/814
[51] Int. Cl.² ...................................... C07C 121/75
[58] Field of Search ............... 260/465 D, 473 S

[56] References Cited
UNITED STATES PATENTS
3,013,069   12/1961   Wilkinson et al. ............... 260/465 X Primary Examiner—Lewis Gotts
Assistant Examiner—Dolph H. Torrence
Attorney, Agent, or Firm—Nestor W. Shust

[57] ABSTRACT

The disclosure covers hindered phenolic nitrile and amide compounds having the formula

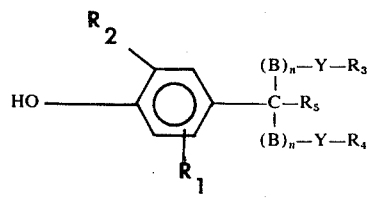

wherein
  $R_1$ and $R_2$ are alkyl or cycloalkyl groups,
  $R_3$ and $R_4$ are alkyl, cyano or amino groups,
  $R_5$ is cyano or amido groups,
  B is alkylene,
  Y is carbonyl or carboxyl groups or a covalent bond, and
  n is zero or one.

These compounds are useful as stabilizers of organic materials subject to deterioration.

3 Claims, No Drawings

HINDERED PHENOLIC CYANO COMPOUNDS

This application is a continuation-in-part of copending application Ser. No. 616,801, filed February 17, 1967 now U.S. Pat. No. 3,721,704.

DETAILED DISCLOSURE

Natural or synthetic resins, such as polypropylene and polyethylene, are often subject to oxidative deterioration. Other unstable organic materials, such as synthetic lubricants, hydrocarbons, natural and synthetic rubbers, oils of animal or vegetable origin, and the like are also unstable to thermal and/or oxidative deterioration. Such materials may also be unstable to ultraviolet and/or visible light.

The compounds of this invention are effective stabilizers of the various organic materials which are normally subject to oxidative and thermal deterioration. The compounds of this invention can be represented by the formula:

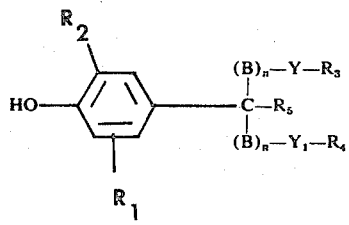

FORMULA I wherein $R_1$ and $R_2$ are alkyl of 1 to 18 carbon atoms; cycloalkyl of 5 to 12 carbon atoms; alkyl of 1 to 8 carbon atoms are preferred, while those with 1 to 4 carbon atoms are more preferred, and most preferable is the tertiary butyl group that is ortho to the hydroxy group;

$R_3$ and $R_4$ are alkyl groups of 1 to 40 carbon atoms, when Y are carboxylic groups; amino or substituted amino groups when Y groups are carbonyl; and cyano groups when Y are covalent bonds;

$R_5$ is cyano or amido group;

Y is carbonyl or carboxylic groups, and

B is an alkylene having from 1 to 6 carbon atoms which can be straight or branched chain; preferably it is ethylene; and n is 0 or 1.

It is understood that in this application and the appended claims the term "alkyl" contemplates both branched and straight chain. Representative of such alkyl groups are thus methyl, ethyl, propyl, i-propyl, n-butyl, s-butyl, t-butyl, octyl, decyl, dodecyl, tetradecyl, octadecyl, and the like. In the definition of $R_3$ and $R_4$ groups, alkyls having 1 to 24 carbon atoms are preferred.

As previously stated, the compounds of the present invention are useful in the stabilization of organic material normally subject to deterioration. The efficacy of these compounds is evident for example from the greatly increased stability of polymeric materials containing a compound of this invention when subjected to oxidative deterioration. In this specification it is understood that polymeric material includes both hompolymeric and copolymeric, such as vinyl resins formed from the polymerization of vinyl halides or from the copolymerization of vinyl esters, α,β-unsaturated acids, α,β-unsaturated esters, α,β-unsaturated ketones, α,β-unsaturated aldehydes and unsaturated hydrocarbons such as butadiene and styrene; poly-α-olefins such as polymethylene, polyethylene, polypropylene, polybutylene, poly-4-methyl pentene-1, polyisoprene and the like, including copolymers of poly-α-olefins; polyurethanes such as are prepared from polyols and organic polyisocyanates; polyamides, such as polyhexamethylene adipamide; polyesters such as polymethylene terephthalates; polymethylmethacrylate; polycarbonates; polyacetals; polystyrene; polyphenylene oxide; polyethyleneoxide; polyacrylics such as polyacrylonitrile; and the like, including mixtures of the foregoing such as those of high impact polystyrene containing copolymers of butadiene and styrene and those formed by the copolymerization of acrylonitrile, butadiene and/or styrene. The preferred polymeric material for stabilization is polypropylene.

Polymeric materials, such as the foregoing, find use as themoplastic molding or coating agents. Moreover, because of their high dielectric strength and its resistance to water, such materials are particularly useful as insulators or dielectrics in condensers and similar equipment. It is known that these polyolefins, such as polyethylene and polypropylene, are attacked by oxygen, particularly when exposed to the atmosphere and at elevated temperatures. During use or manufacture, for example, the desirable properties of the polyolefins are often impaired by oxidative deterioration. Such degradation causes loss in dielectric properties, discoloration, embrittlement, gelation, and the like. In addition to overcoming these difficulties, the compositions of this invention are also stabilized against degradation caused by heat and light.

The compounds of this invention are also particularly useful in stabilizing lubricating oils of various types including aliphatic esters, polyalkylene oxides, silicones, esters of phosphoric and silicic acids, highly fluorine-substituted hydrocarbons, and the like. Specifically, such aliphatic esters which are usefully stabilized comprise dihexyl azelate, di-(2-ethylhexyl)azelate, di-(3,5,5-trimethylhexyl)glutarate, di-(3,5,5-trimethylpentyl) glutarate, di-(2-ethylhexyl)pimelate, di-(2-ethylhexyl) adipate, diisoamyl adipate, triamyl tricarballylate, pentaerythritol tetracaproate, dipropylene glycol dipelargonate, 1,5-pentanediol di-(2-ethylhexanoate), and the like. Other specific lubricants include polyisopropylene oxide, polyisopropylene oxide diether, polyisopropylene oxide diester, and the like, as well as methyl silicone, methylphenyl silicone, tetracosyl silicate, etc. and fluorinated oils, such as perfluorohydrocarbons.

The present invention also relates to the stabilization of fatty materials, including oils of animal or vegetable origin, which tend to deteriorate on standing or exposure to atmospheric oxygen. Also within the scope of the invention are saturated and unsaturated hydrocarbons which tend to deteriorate on storage and use, such as for example, gasolines, jet fuels, diesel mineral oils, and the like. Such hydrocarbons are protected against gum formation, discoloration and other deterioration with the stabilizers of the present invention. Greases and cutting oils may also be stabilized in the same fashion.

These compounds are especially useful in stabilizing polyolefinic material, particularly polypropylene. Fatty acids, such as stearic acid, resins such as acrylonitrile-butadiene-styrene (ABS) terpolymers and polyphenylene oxide, cyclohexene and synthetic oils, such as trimethylolpropane esters of acetic acid, n-valeric acid, hexanoic acid, caprylic acid, pelargonic acid, 2-ethylhexanoic acid, 2-ethylpropanoic acid, and 2-methylpentanoic acid, and mixtures thereof are also very effectively stabilized with the foregoing stabilizers.

The stabilizers of this invention are also useful in stabilizing rubber e.g., artificial and natural rubber. Other examples of rubber which may be stabilized according to the invention include polybutadiene rubber, polyisoprene rubber, styrenebutadiene rubber, butyl rubber, nitrile rubber, neoprene rubber and blends of artificial rubber with natural rubber, such as for example natural rubber with polybutadiene rubber. Broadly contemplated is the stabilization of any rubber normally subject to degradation.

Particularly preferred stabilizers of the invention are 4-(3', 5'-di-t-butyl-4'-hydroxyphenyl)-4-cyanopimelonitrile di-n-octadecyl-4-(3',4'-di-t-butyl-4'-hydroxyphenyl)-4-cyanopimelate 4-(3',5'-di-t-butyl-4'-hydroxyphenyl)-4-cyano-1,7-heptane dioic acid diamide 4-(3',4'-di-t-butyl-4'-hydroxyphenyl)-4-carbamyl-1,7-n-heptane dioic acid diamide.

In general, the compounds of this invention are employed in a concentration of from about 0.001% to about 10% by weight, preferably from about 0.1% to about 1% by weight. The specific concentration employed varies with the unstabilized material and the specific stabilizer. When mixtures of two or more stabilizers are employed in an unstable material, usually the total amount of added stabilizer does not exceed 10% of the total stabilized material.

The stabilizer compounds of this invention may be used also to stabilize organic material in combination with other additive agents, such as e.g., antioxidants, antiozonants, pourpoint depressants, corrosion and rust inhibitors, dispersing agents, chelating agents, surface active agents, demulsifiers, anti-foaming agents, carbon black, accelerators, plasticizers, color stabilizers, heat stabilizers, ultraviolet absorbers, dyes and pigments, fillers, etc.

Merely by way of illustration, the compounds of this invention where $R_5$ is cyano, $R_3$ and $R_4$ are alkyl groups, B is ethylene or substituted ethylene and Y is carboxyl group are prepared by reacting the appropriate alkyl substituted hydroxyphenylacetonitrile and acid amide with alkyl acrylate or substituted alkyl acrylate esters in the presence of a base catalyst. More generally, the compounds of this invention where B is alkylene can be prepared by reacting the starting material noted above with a haloalkyl ester in known fashion to give the desired compound. Compounds where $R_5$ is cyano, Y is carbonyl and $R_3$ and $R_4$ are amino groups can be prepared by reacting the same starting material as noted above with acrylamide or a substituted acrylamide or more generally, with a haloalkyl carboxamide.

The starting materials for making the compounds of the present invention are available commercially and/or may readily be prepared by those skilled in the art from the teachings of the prior art.

As mentioned, the stabilizers employed in this invention may be used alone or in combination with other stabilizers or additive materials. Especially useful in certain cases is the stabilizer di-lauryl-beta-thiodipropionate. Special mention also is made of di-stearyl-beta-thiodipropionate.

Broadly, compounds of this formula:

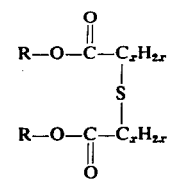

wherein

R is an alkyl group having from 6 to 24 carbon atoms and x is an integer from 1 to 6, are useful stabilizers in combination with the compounds of this invention.

In this specification the term "stabilization" includes protection not merely against oxidative deterioration but also protection against deterioration caused by thermal effects, visible and/or ultraviolet radiation, etc. Thus, the stabilizers of the invention are contemplated as acting to protect unstable materials not only against oxidative deterioration but also against other types of deterioration such as thermal degradation or degradation caused by visible and/or ultraviolet light, particle radiation, etc.

The compositions are prepared by a number of means, depending on the substrate. For example, the instant stabilizers can be mixed into liquid substrates and can be milled into thermoplastic substrates. For addition to varnishes, the stabilizers can be dissolved in a co-solvent and this added to the varnish. As mentioned hereinbefore and exemplified hereinafter, levels of the stabilizers in the substrate may vary considerably depending on the particular end application, degree of protection desired, variations in the substrate, and presence of synergizing stabilizers (ultraviolet absorbers, dialkyl thiodipropionates, and the like).

Selecting the proper use level is well within the capabilities of those skilled in the art.

Addition of the instant stabilizers imparts little or no color to most substrates and, after formulation, they are characterized by substantial ability to retain good color under processing conditions and weathering.

The instant invention provides polyolefin compositions protected against thermal and oxidative degradation during processing. It provided minimized melt-flow drift, and extends the service life of finished articles. Particularly noteworthy are the instant compositions' excellent color retention under prolonged heat or light exposure, and their resistance to extraction by boiling water and alkaline detergents.

The following examples describing certain representative embodiments of this invention will serve to further illustrate the nature of the invention. It is to be understood that the examples are merely illustrative and intended to enable those skilled in the art to practice the invention in all of the embodiments therefrom and do not in any way limit the scope of the invention defined in the claims.

In the examples, parts are by weight unless otherwise indicated and the relationship between parts by weight and parts by volume is as that between grams and cubic centimeters.

EXAMPLE 1

4-(3',5'-Di-t-butyl-'-hydroxyphenyl)-4-cyanopimelonitrile 24.5 parts of 4-(3',5'-di-t-butyl-4'-hydroxybenzyl cyanide (0.10 moles) is dissolved in 40°C in 150 parts of t-butanol containing 3.36 parts (0.03 moles) of potassium t-butoxide to give a clear green solution. 10.6 parts of acrylonitrile is then added dropwise over a period of 15 minutes and the reaction mixture heated at reflux for 5 hours during which time the color changes to yellowish brown. The reaction mixture is cooled to 30°C. 100 parts of 10% acetic acid is added and the reaction mixture cooled to 10°C. The precipitated crystals are filtered, washed with water and dried. The crystals melt at 124°–126°C. Recrystallization from a solvent mixture of 75:25 t-butanol-isopropanol yields white crystals melting at 124°–126°C.

Analysis: Calculated for $C_{22}H_{29}ON_3$:

| C | H | N |
|---|---|---|
| 75.17% | 8.31% | 11.95% |
| 75.57% | 7.98% | 12.20% |

EXAMPLE 2

4-(3',5'-Di-t-butyl-4'-hydroxyphenyl)-4-cyano-1,7-heptane dioic acid amide

Following the procedure of Example 1 except for employing acrylamide in place of acrylonitrile, the above named product is obtained.

EXAMPLE 3

Dimethyl-4-(3',5'-di-t-butyl-4'-hydroxyphenyl)-4-cyanopimelate 17.5 parts of 4-(3',5'-di-t-butyl-4-hydroxyphenyl)-4-cyanopimelonitrile is dissolved in 100 parts of methanol and then cooled to −10°C, the fine suspension being saturated with gaseous hydrogen chloride at −5° to 0°C over a period of 40 minutes. The reaction mixture is then stirred and heated at reflux for 30 minutes. The resultant crystal slurry is then poured onto 500 parts of ice. After the ice has melted the crystals are filtered, washed with water, then redispersed in water and heated on the steam bath for 1½ hours. The dispersion is then cooled, the precipitate being filtered and taken up in ether. The ether solution is then washed with sodium bicarbonate and dried over sodium sulfate. The ether solution is concentrated in vacuum to yield the product as a crystalline residue. The residue is then recrystallized from n-hexane yielding white crystals melting at 110°–112°C.

EXAMPLE 4

Di-n-octadecyl-4-(3',5'-di-t-butyl-4'-hydroxyphenyl)-4-cyanopimelate

Following the procedure of Example 1 except for substituting octadecyl acrylate in place of acrylonitrile, the above named product is prepared which has a melting point of 70°–72°C.

EXAMPLE 5

4-(3',5'-Di-t-butyl-4'-hydroxyphenyl)-4'-cyano-1,7-heptanedioic acid diamide Following the procedure of Example 1 except for employing acrylamide instead of acrylonitrile, the above named compound is prepared.

EXAMPLE 6

4'(3',5'-Di-t-butyl-4'-hydroxyphenyl)-4'-carbamyl-1,7-n-heptane dioic acid diamide Following the procedure of Example 1, 3,5-di-t-butyl-4-hydroxyphenylacetamide is reacted with acrylamide yielding the above named product.

EXAMPLE 7

Unstabilized polypropylene powder (Profax 6501) is thoroughly blended with 0.1% by weight of di-n-octadecyl-4-(3',5'-di-t-butyl-4'-hydroxyphenyl-4-cyanopimelate and 0.5% dilauryl β-thiodipropionate (DLTDP). The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149°C. The resultant composition is stabilized against oxidative deterioration for 425 hours. Unstabilized polypropylene deteriorates after only 3 hours.

In like manner as the foregoing, a composition was prepared having 0.1% by weight di-n-octadecyl-4-(3',5'-di-t-butyl-4'-hydroxyphenyl)-4-cyanopimelate and 0.5% DLTDP. Sheets made from this composition were stabilized for 710 hours.

What is claimed is:

1. Compounds of the formula

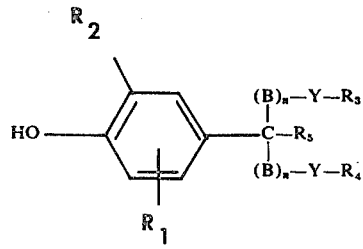

wherein
$R_1$ and $R_2$ are alkyl of 1 to 8 carbon atoms;
Y is oxycarbonyl group;
$R_3$ and $R_4$ are alkyl groups of 1 to 40 carbon atoms;
$R_5$ is cyano group;
B is alkylene having 2 carbon atoms, and
n is zero or one.

2. Compound of claim 1 which is dimethyl-4-(3',5'-di-t-butyl-4'-hydroxyphenyl)-4-cyanopimelate.

3. Compound of claim 1 which is di-n-octadecyl-4-(3',4'-di-t-butyl-4'-hydroxyphenyl)-4-cyanopimelate.

* * * * *